United States Patent  
Keith et al.

[15] 3,658,691  
[45] Apr. 25, 1972

[54] SERIAL REFORMING WITH PLATINUM-RHENIUM ON ACIDIC SUPPORT AND PLATINUM ON NON ACIDIC SUPPORT

[72] Inventors: Carl D. Keith; William C. Pfefferle, both of Engelhard Minerals & Chemicals Corporation, 497 Delancy Street, Newark, N.J. 07105

[22] Filed: Mar. 20, 1970

[21] Appl. No.: 21,516

[30] Foreign Application Priority Data

Dec. 8, 1969 Canada..................................069,259

[52] U.S. Cl. ...............................208/65, 208/138, 208/139
[51] Int. Cl. ....................................C10g 35/08, C10g 39/00
[58] Field of Search ......................................208/138, 139, 65

[56] References Cited

UNITED STATES PATENTS

| | | | |
|---|---|---|---|
| 3,287,253 | 11/1966 | McHenry et al. | 208/65 |
| 3,415,737 | 12/1968 | Kluksdahl | 208/139 |
| 3,449,237 | 6/1969 | Jacobson et al. | 208/138 |
| 2,838,444 | 6/1958 | Feter et al. | 208/138 |
| 2,838,445 | 6/1958 | Feter et al. | 208/138 |

*Primary Examiner*—Herbert Levine
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

The disclosure is directed to systems for the catalytic reforming of gasoline boiling range hydrocarbons to improve their octane rating. Reforming is conducted in the presence of molecular hydrogen and platinum group metal-type catalysts disposed in a plurality of fixed bed reaction zones. In an initial dehydrogenation reaction zone, the catalyst contains a platinum group metal and rhenium on a solid, acidic oxide type support while in a subsequent, paraffin dehydrocyclization part of the system, the platinum group metal is disposed on a base of relatively low acidity, e.g., alumina. In a special operation, the inlet temperatures of the reactors can be controlled with respect to the length of the total reforming cycle.

19 Claims, No Drawings

SERIAL REFORMING WITH PLATINUM-RHENIUM ON ACIDIC SUPPORT AND PLATINUM ON NON ACIDIC SUPPORT

The present invention is directed to the catalytic reforming of gasoline boiling range hydrocarbons. More particularly, this invention is concerned with the catalytic reforming in the presence of molecular hydrogen of naphthene and paraffin-containing hydrocarbon fractions boiling primarily in the gasoline or naphtha range, in a multiple, adiabatic, fixed bed catalyst conversion system employing a catalyst containing a platinum group metal and rhenium on a solid, acidic oxide type support and a supported platinum group metal catalyst to improve the octane number of the feed.

In view of the endothermic nature of catalytic reforming reactions, there is usually employed a series of adiabatic catalyst bed reactors in such operations. One method comprises preheating the naphtha charge to the desired inlet temperature, passing it to the first reactor, reheating effluent from the first reactor and passing it into the second reactor, and so on through the remaining reheaters and reactors of the series. The inlet temperatures of each of the reactors can be the same or different and they generally fall in the range of about 850° to 960°F., or more. The temperature drop exhibited in each of the series of catalyst beds progressively decreases in the direction of hydrocarbon flow. For instance, the temperature drop in the first reactor of a three reactor series usually ranges between about 50° to 150°F., whereas the temperature drop in the terminal reactor is generally about 25°F. maximum and the last reactor may be exothermic, especially in high octane-higher pressure operations, e.g., 325 psig or more. In these systems, it is generally considered that in one or more of the reactors in the first part of the series, the predominant reaction is dehydrogenation, for instance, the conversion of naphthenes to aromatics, while in one or more of the reactors in the terminal part of the series a principal reaction is paraffin dehydrocyclization. It is also known that catalysts composed essentially of small amounts of a platinum group metal or both a platinum group metal and rhenium on a solid support can be used in such reforming operations.

The present invention is based on the use in at least one of the naphthene dehydrogenation zones of such reforming systems, of a catalyst having both a platinum group metal and rhenium as the essential promoting metals on a porous, solid, acidic oxide type support; and the use in at least one of the paraffin dehydrocyclization zones of a catalyst having a platinum group metal as the essential promoting metal component, for instance, the catalyst contains no significant amount of a rhenium component. When the reforming operation is conducted with these distinct catalysts in the separately designated reaction zones a highly advantageous yield-octane number-catalyst aging relationship is obtained.

In the operation of this invention the naphthene dehydrogenation reaction zones serve to convert naphthenes to aromatics and perhaps there is also a minor amount of paraffin dehydrogenation. In a given system there may be only a single naphthene dehydrogenation reaction zone, although the series of catalyst beds may have 2, 3 or even up to 5 of such zones with the number generally rising as the naphthene content of the feed increases. In the present invention the naphthene dehydrogenation zones employing the designated catalyst have an inlet temperature of at least about 820°F., and it is preferred that these zones include the first catalyst bed of the series. Often, the inlet temperatures for the naphthene dehydrogenation zones will be in the range of about 820° to 920°F., preferably about 840° to 890°F. In some reforming operations there may be provided a preliminary reactor in which the inlet temperature is less than about 820°F., and naphthene dehydrogenation may take place in this reaction zone. In such systems the heating of the feedstock is usually accomplished by indirect exchange, for instance, with the reformate product, rather than by a fired preheater. In the method of the present invention the designated platinum group metal-rhenium catalyst is employed in at least the initial, and preferably in all, of the naphthene dehydrogenation zones which have inlet temperatures of at least about 820°F. The catalyst in any lower temperature reactor is usually of the platinum group metal type and may be selected according to the desires of the operator, but is preferably the platinum group metal and rhenium containing catalyst described herein. By the term inlet temperatures, reference is made herein to the temperature of the initial portion of the reactor in question.

In a preferred operation the inlet temperatures to the naphthene dehydrogenation zones are in the range of about 820° to 920°F. for at least about 80 percent of the total reforming processing cycle. When there are at least two such naphthene dehydrogenation reactors, it is preferred that the inlet temperature of the first such reactor not exceed about 900°F., while the inlet temperature of the subsequent naphthene dehydrogenation reactors be maintained below about 920°F., for at least about 80 percent of the total reforming processing time. As a further refinement in this type of operation, the total temperature drop in each of the naphthene dehydrogenation zones does not vary more than about 30°F. over at least about 80 percent of the total reforming cycle. The reforming system can be run so that there is about 75 to 95 weight percent of the theoretical conversion of naphthenes in the overall dehydrogenation zones which provides an effluent from the last-in-series naphthene dehydrogenation reaction zone having less than about 10 weight percent naphthenes above the minimum allowed by the thermodynamics of the system. Frequently, the conditions in the naphthene dehydrogenation zones include pressures of about 50 to 500 psig, preferably about 100 to 350 psig, and weight hourly space velocities for the overall dehydrogenation reaction zones of about 0.5 to 4 WHSV.

As previously stated, at least one of the reactors in the terminal part of the series, and preferably at least the last, employs a catalyst containing a platinum group metal as the essential promoting metal, and essentially no rhenium, and a principal reaction effected is the dehydrocyclization of paraffins to aromatics. There may be more than one of such paraffin dehydrocyclization reactors and each of such reactors has an inlet temperature sufficient to give product of desired octane number, say about 900° to 1,000°F., preferably about 900° to 960°F. It is further preferred that such inlet temperatures be at least about 20°F. greater than the inlet temperatures of any of the naphthene dehydrogenation reactors for at least about 50 percent of the total reforming process time. Frequently, the inlet temperature of the last reactor of the series exceeds about 930°F. for at least about 25 percent of the total reforming cycle. The catalyst volume in the total naphthene dehydrogenation zones compared to that in all of the paraffin dehydrocyclization zones is often about 1:20 to 3:1; preferably this ratio is at least about 1:5 when the naphthene content of the gasoline or naphtha feed is at least about 30 volume percent, and the ratio is less than about 1:4 when the paraffin content of the gasoline or naphtha feed is at least about 60 volume percent. Although the system of this invention is described with reference to naphthene dehydrogenation reaction zones and paraffin dehydrocyclization reaction zones there may be other catalytic reactors in the series which are operated under conditions such that they do not fall in the category of the described naphthene dehydrogenation or paraffin dehydrocyclization zones.

During the reforming operation hydrogen is supplied to the reaction zones by recycle of hydrogen-containing gases separated from the product effluent. The recycle gas in the method of this invention is relatively high in hydrogen content and low in methane and therefore affords a higher hydrogen partial pressure for a given total pressure and aids in extending catalyst life. Also, the purer hydrogen can be more readily used in other processes.

Although the total hydrogen gas stream which is recycled can be passed to the initial naphthene dehydrogenation reaction zone, and thence throughout the series of reactors, it is preferred that only a portion of the recycle gases go to the naphthene dehydrogenation reaction zones with there being separate hydrogen gas introduction to the paraffin dehydrocyclization zones. Thus, there may be provided about 0.5 to 8 moles, preferably about 1 to 4 moles, of hydrogen recycle gas per mole of hydrocarbon boiling in the gasoline range introduced into the initial naphthene dehydrogenation zone which has an inlet temperature of about 820°F., while there is passed directly to the paraffin dehydrocyclization zones sufficient hydrogen gas to give in such zones about 7 to 30 moles, preferably about 8 to 15 moles, of total hydrogen recycle gas per mole of hydrocarbon boiling in the gasoline range passing into the paraffin dehydrocyclization zones. Of course, the total gas to such dehydrocyclization zones includes that coming from the preceeding reactors as well as any portion of the recycle gas passed directly into the paraffin dehydrocyclization zones. The latter addition, that is, the direct charging of recycle gas to the paraffin dehydrocyclization zones, is usually at least about 3 moles of hydrogen recycle gas, preferably at least about 5 moles, per mole of hydrocarbon boiling in the gasoline range passing into such zones.

As noted before, one of the catalysts employed in the process of the present invention contains as promoters small, catalytically-effective amounts of each of a platinum group metal and rhenium supported by a porous, acidic oxide type base. The base has a tertiary butylbenzene dealkylation activity of about 20 cubic centimeters (STP) per gram per minute at 455°C., as measured without water addition by the method of Marvin F. L. Johnson and John S. Malik. "Dealkylation of t-Butylbenzene by Cracking Catalysts," Journal of Physical Chemistry, Vol. 65, pgs. 1,146–1,150 (1961), preferably such activity is about 30 to 500. Surface areas of such bases are usually a minimum of about 100 square meters per gram, preferably about 150 to 500 or more square meters per gram. The support constitutes the major portion of the catalyst and can be of a variety of materials among which are combinations of silica, alumina, zirconia, titania, magnesia, boria and aluminosilicates, especially those crystalline aluminosilicates having relatively uniform pores having openings whose diameters are at least about 6 Angstrom units, preferably in the approximate 10 to 15 Angstrom unit range. These supports, which are preferably metal oxides, can also contain halogens, especially fluorine and chlorine.

Particularly useful acidic materials are silica-alumina, including aluminosilicates, especially crystalline aluminosilicates. The crystalline aluminosilicates usually have silica-to-alumina mole ratios of at least about 2:1, for instance about 2 to 12:1, preferably about 4 to 6:1. The crystalline aluminosilicates are usually available or made in sodium form and this component can be reduced, for instance to less than about 4, or even less than about 1, weight percent, through ion exchange with hydrogen ions, hydrogen-precursors such as ammonium ions, or polyvalent metals. Suitable metals include the rare earths such as cerium, and their mixtures. Mixtures of alumina and amorphous silica-alumina cracking catalysts, especially those having a major proportion of silica, e.g., about 60 to 90 weight percent silica and about 10 to 40 weight percent alumina, are suitable bases. Advantageous bases are composed of mixtures of alumina and crystalline aluminosilicates, for instance containing about 0.1 to 25 weight percent of the crystalline aluminosilicate, preferably about 1 or even 5 to about 15 weight percent. The alumina in such mixed bases can be of the type described below.

The platinum group metal and rhenium in the foregoing described acidic support catalysts are each often about 0.05 to 3 weight percent of the catalyst, preferably about 0.1 or 0.3 to 1 weight percent. Platinum is the most preferred metal in such catalysts but other platinum group metals such as palladium and rhodium can be used. When the catalyst is in a virgin state, the promoting metals are preferably for the most part indectable by X-ray diffraction analysis, which indicates that if the metals are present in the catalyst as elemental metals or alloys, their crystallite sizes are less than about 50 A. A common method of providing the platinum group metal in the catalyst is by contact of one or more of the porous, acidic oxide type components of the support, either in hydrous or in calcined form, with an aqueous solution of a chlorine-containing compound, for instance chloroplatinic acid. In this manner, chlorine is incorporated in the catalyst for instance, in amounts of about 0.2 to 2 weight percent, preferably about 0.3 to 1 weight percent. Such amounts of chlorine component can also be provided in the catalyst from a source other than the compound supplying the platinum group metal. Rhenium can also be added to one or more of the porous, acidic oxide type components of the hydrous or calcined support through contact with an aqueous solution of a rhenium compound, e.g. perrhenic acid or ammonium perrhenate. If promoting metal is added to a calcined support, the resulting composite is generally recalcined.

The catalyst which can be used in one or more to all of the paraffin dehydrocyclization zones and even in all but the initial naphthene dehydrogenation reactor of the system, contains a platinum group metal on a support and has an essential absence of rhenium, e.g. less than about 0.05 weight percent, or less than about 0.01 weight percent or even no detectable amount, of rhenium. As stated above, it is preferred that these catalysts which can be designated as non-rhenium catalysts, be used in all reaction zones except the naphthene dehydrogenation zones. These non-rhenium catalysts can be made by various procedures, for instance those described above with respect to the platinum group metal and rhenium-containing catalysts, but, of course, without any significant addition of rhenium and with the use of relatively non-acidic, porous solid supports. The platinum group metal is present in a small, promoting amount sufficient to provide reforming or dehydrocyclization activity to the catalyst. Such amounts often include at least about 0.05 weight percent of the platinum group metal, preferably about 0.1 or 0.3 to 1 percent, based on the total weight of the catalyst. The major portion and essential balance of the catalyst is the relatively non-acidic support, although the catalyst can contain minor amounts of other promoters as long as the rhenium content is not significant and the activity of the catalyst is not increased too greatly. Thus, the support or base, with any other non-platinum group metal component added, has a tertiary butylbenzene dealkylation activity of up to about 15 cubic centimeters (STP) per gram per minute at 455°C., without water addition as measured by the above-mentioned test, or even up to about 10 cc.(STP)/g./min. Alumina is the preferred non-acidic support, and platinum is the preferred platinum group metal in the catalyst.

The alumina support in the non-rhenium catalyst of the present invention often has a surface area of at least about 150 square meters per gram and is preferably composed to a major extent of gamma-family alumina modifications derived by the activation or calcination of alumina trihydrates. These gamma-family or activated alumina modifications include among others, gamma and eta aluminas. U.S. Pat. No. 2,838,444 discloses this type of alumina support having surface areas in the range of about 350 to 550 square meters per gram, while in U.S. Pat. No. 2,838,445 there is described catalyst supports made from predominantly trihydrate alumina precursors, the supports having surface areas in the range of about 150 to 350 square meters per gram. These supports are suitable for use in the present invention, especially the higher area supports of U.S. Pat. No. 2,838,444 which supports during use may have their surface areas reduced to about 150 to 250 square meters per gram. As stated, the preferred alumina precursors predominate in trihydrate which may contain one or more of the bayerite, gibbsite or nordstrandite (previously called randomite) forms, and preferably a major amount of the trihydrate is composed of bayerite or nordstrandite which, when calcined, can form eta alumina. It is also advantageous that the hydrous alumina precursor contain about 65 to 95 percent of the trihydrate with the essential balance being composed of one or both of the alumina monohydrate, boehmite, or amorphous hydrous alumina. Preferred supports have pore volumes of at least about 0.1 cc./gm.; preferably at least about 0.15 cc./gm., in pores greater than about 100 A radius. It is also preferred that the supports have at least about 0.05 cc./gm. in pores greater than about 300 A or even greater than about 600 A radius. These determinations are by the method described by Barrett, Joyner and Halenda, JACS, 73, p. 373 (1951).

Calcination of both types of catalysts used in this invention can be conveniently conducted at temperatures of the order of about 700° to 1,200°F., or more, for instance in an oxygen-containing gas, and this operation can be controlled to give a final catalyst of desired surface area. At an appropriate stage in the manufacture of the catalysts, the particles can be formed into macrosize as distinguished from finely divided or fluidized catalyst types. The macrosize particles frequently have diameters in the range of about 1/64 to 3/8 inch, preferably about 1/16 to 1/4 inch, and if not spherical, the particles usually have lengths of about 1/64th to 1 inch or more, preferably about 1/8th to 1/2 inch.

The process of this invention involves hydrocarbon reforming conducted at elevated temperatures up to about 1,000°F., and under a reducing atmosphere provided by the presence of a molecular hydrogen-containing gas. The feedstocks include gasoline boiling range hydrocarbons whether they boil over a broad or narrow temperature range. In such operations, a naphtha, a fraction thereof or other similar boiling range hydrocarbons whose aliphatic and cycloaliphatic constituents are for the most part saturated and which may contain some aromatics, is converted to a product having greater aromaticity and higher octane rating. Relatively pure aromatics can be separated from the products. The feeds employed in the process of the invention include naphthas composed of at least about 15 percent up to about 70 percent (by volume) naphthenes and at least about 25 percent paraffins and generally have clear or unleaded research octane ratings (RON) in the range of about 30 to 60. Advantageously, the total hydrocarbon feed and recycle gas passing to a given reactor of the invention contain less than about 10 p.p.m. (by weight) sulfur, and preferably less than about 5 p.p.m. combined nitrogen. Superior operations can be provided where the hydrocarbon feed and recycle gas stream to all reactors have less than about 5 p.p.m. sulfur and less than about 2 p.p.m. combined nitrogen. These impurity levels are based on the weight of total process materials passing to a given reactor.

Although the reforming system is advantageously operated with less than about 50 p.p.m. by volume water, preferably less than about 10 p.p.m., based on the hydrogen gas present, it can be enhanced by the provision of controlled amounts of water in the naphthene dehydrogenation reactors, especially where the catalyst base contains amorphous silica-alumina as the essential acidic component. Thus, we can supply about 15 to 250 p.p.m. $H_2O$, preferably about 20 to 100 p.p.m. to the naphthene dehydrogenation zone gas to improve the operation. Any recycle gas passing directly to the paraffin dehydrocyclization zones can be dried to less than about 10 p.p.m. $H_2O$ to reduce the water content based on the total hydrogen gases in the dehydrocyclization zones.

The reforming systems are usually conducted at processing conditions which include reactor inlet temperatures of about 825° to 975° or 1,000°F., and total pressures of about 50 to 600 psig, preferably about 100 to 350 psig. During the operation, hydrogen-containing effluent gas is recycled to the reaction system, the latter having a series of adiabatic fixed bed catalyst reactors each being preceded by a feed heater. The recycle gas ratio is usually such to provide about 3 to 30 moles of hydrogen gas per mole of gasoline boiling range hydrocarbon feedstock. Also, the hydrocarbon charge is often passed to the reactor system at a rate such that the overall space velocity is about 0.5 to 15 WHSV (weight of hydrocarbon per weight of catalyst per hour), preferably about 1 to 10 WHSV. The severity of the reaction conditions are such that the normally liquid reformate or product from the terminal reactor has a RON of at least about 90 or even at least about 95 to 100. Carbonaceous deposits accumulate on the catalysts of this invention as reforming proceeds and as a result the catalysts lose activity which can be counteracted by increasing the reaction temperature. Eventually, however, when the reactor inlet temperatures reach a desired maximum, for instance, in the range of about 950° to 1,000°F., especially at about 970°F. and above, it becomes inadvisable to increase the temperature further, otherwise undue aging of the catalysts may result. The catalysts can then be regenerated by carbon burn-off which improves the catalytic characteristics sufficiently for the catalysts to be reused on an economic basis.

At the beginning of regeneration, the carbon content of the catalysts is generally above about 0.5 weight percent, often greater than about 10 weight percent. During regeneration of the catalysts by burning, the carbon level is often reduced to below about 0.5 weight percent, preferably below about 0.2 weight percent. This burning is conducted through contact of the catalysts with an oxygen-containing gas and generally the amount of oxygen is controlled to maintain the temperature of the catalysts from about 700° to about 900° or 1,000°F., preferably in the temperature range of about 700° to 850°F. The pressure maintained during burning is preferably elevated, for instance, is about 50 to 500 psig. The controlled burning is usually initiated with an inert gas, e.g. nitrogen, carbon dioxide or their mixtures, containing a small amount of oxygen, for instance, up to about 1 mole percent and preferably with an oxygen partial pressure of at least about 0.2 psig. When the bulk of the carbon has been removed from the catalysts by a gas containing the relatively low concentration of oxygen, the amount of oxygen can be increased somewhat to insure that sufficient carbon has been removed from the catalysts without exceeding the desired temperature. This type of treatment is exemplified by one or more burns-through of the catalyst beds at about 800°F. to 850°F., and about 100 to 500 psig, with a gas containing above about 0.5 to about 3 or somewhat greater mole percent oxygen. Other suitable carbon-burning procedures can be employed as long as the temperatures are controlled and the carbon level of the catalysts is adequately lowered. During carbon burn-off and subsequent treatments of the catalysts with an oxygen-containing or other gas at elevated temperatures, the gas should be dry enough to avoid undue additional sintering of the catalysts and loss of surface area. Such loss generally increases as temperature, water content of the gas or treating time is raised.

Especially where the crystallite size of the promoting metals on the catalysts is to be reduced, the catalysts can, after carbon burn-off, be contacted with an oxygen-containing gas at a temperature of about 800° to 1000°F., preferably about 850° to 950°F., and, if desired, an elevated pressure such as about 100 to 500 psig. This treatment has sometimes been referred to in the art as an air soak and the oxygen content of the gas is usually greater than that present in the gas employed for carbon burn-off. Thus, the oxygen content of the gaseous stream employed for air soaking is often at least about 5 mole percent with there having been found no particular reason for increasing the gas content above about 20 mole percent. The air soaking period is generally at least about one hour and is usually continued for several hours, for instance, in the range of about 5 to 24 hours. Regeneration and air soaking procedures suitable for the catalysts of the present invention are disclosed in U.S. Pat. No. 2,922,756, herein incorporated by reference.

The regenerated catalysts, whether air-soaked or not, can be reactivated by a treatment involving contact with chlorine or other chlorine-containing material. Especially suitable chloride-reactivation procedures are described in Canadian Pat. applications Ser. No. 054,055, filed June 11, 1969, and Ser. No. 054,906, filed June 20, 1969, both herein incorporated by reference.

The virgin catalysts of this invention or used catalysts, of such types, say after regeneration with or without reactivation, can be reduced by contact with a gaseous stream which contains molecular hydrogen. The treatment is at an elevated temperature, for instance, about 600° to 1000°F., preferably about 750° to 950°F. Elevated pressures are preferably used in the reduction and can be, for example, about 20 to 600 psig, preferably about 50 to 350 psig. Apparently, the reduction converts the catalytic promoting metals to their elemental state, but if a vaporous sulfiding agent be present some or all of the promoting metals may be sulfided. By using an essentially dry, hydrocarbon-free gas during the reduction, hydrocracking is avoided as are its attendant disadvantages of, for instance, excessive catalyst temperature rises and the formation of catalyst poisons or deleterious agents such as carbon monoxide which can cause undesirable crystallite growth of the catalytic promoting metals. Also, carbon monoxide, for example, can interact with the catalytic promoting metals causing deactivation. The gas stream employed during reduction is often composed of about 50 to 100 volume percent hydrogen, preferably about 70 to 99 to 100 volume percent, with any remaining components being up to about 50 volume percent of inert gas such as nitrogen or methane. The gas advantageously is dry and contains less than about 1 volume percent hydrocarbons having at least two carbon atoms, preferably less than about 0.1 percent.

To avoid undue hydrocracking of the hydrocarbon feedstock during the initial period of hydrocarbon processing after the catalysts of the present invention, especially the platinum group metal-rhenium catalyst, are placed on-stream, the catalysts can be contacted with a gas containing sulfur-providing component in vaporous form. This sulfiding treatment can be conducted simultaneously with or subsequent to the reduction. If sulfiding is conducted simultaneously with the reduction, a non-carbonaceous sulfur compound should be used due to the presence of oxygen in the system and to avoid any localized overheating of the catalyst. A suitable sulfur-providing material or sulfiding agent is $H_2S$. The amount of sulfiding agent employed is at least about 25 percent or even at least about 50 percent of the stoichiometric amount needed to give one atomic weight of sulfur for each atomic weight of total platinum group metal and rhenium in the catalyst, preferably the amount is at least about 50 percent to say up to about 500 percent or more. The sulfiding operation can be done at an elevated temperature, e.g., about 650° to 950°F., and at any suitable pressure, preferably an elevated pressure such as about 100 to 500 psig. The sulfiding gas is reductive and usually contains a minor amount of the sulfur-bearing component, e.g. about 0.1–10 volume percent, preferably about 0.2 to 3 percent, with the major component being hydrogen or an inert gas such as nitrogen. Also, the sulfiding agent can be added to the inlet of each reactor of the hydrocarbon processing system to minimize contact with other equipment surfaces where corrosion might occur. When the sulfiding is conducted simultaneously with or subsequent to reducing the catalysts with hydrogen, the catalysts are in sulfided form when they first contact the hydrocarbon being processed which avoids excessive hydrocracking with its attendant yield and selectivity losses.

It can be further advantageous in minimizing hydrocracking caused by the reduced catalysts whether presulfided or not, to supply vaporous sulfiding agent to the conversion system when charging of the hydrocarbon feedstock is begun. Thus, a small amount of the sulfiding agent, sufficient to significantly reduce hydrocracking during the initial portion of the processing cycle, can be added to the system. The sulfiding agent can conveniently be charged with the recycle gas or with the hydrocarbon stream. The amounts of sulfiding agent employed include about 1 to 500 p.p.m. by volume based on the hydrogen passing to the reaction system, preferably about 5 to 200 p.p.m. This sulfiding-agent addition can be continued as long as the operator desires but often the addition will approximate the time period in which, in the absence of the sulfiding-agent addition, the catalysts would cause significantly excessive hydrocracking. Hydrocracking can be detected in the processing system by any desirable means such as a drop in the hydrogen content of the off-gases, a change in the ratio of methane to propane in the gases, or the temperature rise in the catalyst beds. The period of sulfiding-agent addition upon placing the reduced catalysts back on processing can include, for instance, about 1 to 60 or more days and is often about 3 to 10 days.

The present invention will be further illustrated by the following example.

A 20,000 BPSD naphtha reforming operation is carried out in a four reactor system employing a straight run naphtha feed containing approximately 45 percent naphthenes, approximately 4 percent paraffins and approximately 15 percent aromatics. The naphtha feed has a RON of 40, a boiling range of 150°F. to 380°F., less than about 5 p.p.m. $H_2O$, less than about 4 p.p.m. S, less than about 2 p.p.m. N, and less than about 10 p.p.m. Cl. The naphtha feed in admixture with 3 moles of hydrogen-containing recycle gas is heated to temperatures of about 890°F., and passed to the initial reactor. The reactor system is at a pressure of about 250 psig. The first reactor, as well as each of the next two reactors, contains a fixed bed of catalyst having about 0.6 percent Pt and 0.6 percent Re on a base having a t-butylbenzene dealkylation activity of about 450 cc(STP)/g./min. at 455°C. (without water addition) and composed of 70 percent of an activated alumina and 30 percent of an amorphous silica-alumina having about 12 percent alumina. The fixed bed catalyst in the last reactor has about 0.6 percent Pt on an activated alumina having a t-butylbenzene dealkylation activity of 8 cc.(STP)/g./min. at 455°C. (without water addition).

Both catalysts are 1/16 inch extrudates, and the catalyst in the last reactor has an alumina base of the type disclosed and claimed in U.S. Pat. No. 2,838,444. The alumina is derived from a hydrous alumina mixture having about 75 percent trihydrate which is predominantly bayerite and nordstrandite, the essential balance of the hydrous alumina being boehmite and amorphous hydrous alumina. Both catalysts in the calcined, virgin state have surface areas above about 400 square meters per gram, and chloride contents of about 0.7 weight percent derived from the use of chloroplatinic acid as the source of platinum.

The catalyst-reactor distribution is 1:1:1:3 by volume and the overall weight hourly space velocity is 2.0. The effluent from the first reactor which is at a temperature about 120°F. lower than the inlet temperature, is heated to 900°F. for charging to the second reactor. The temperature of the effluent from the second reactor is about 95°F. lower than the inlet temperature, and the effluent is heated to 915°F. prior to being introduced into the third reactor. Effluent from the third reactor is at a temperature about 50°F. lower than the inlet temperature of the reactor. This effluent containing about 5 percent by weight naphthenes, is combined with the remainder of the hydrogen-containing gas. The combined feed and recycle gas are then heated to a temperature of 965°F., prior to introduction into the fourth reactor where the reforming is completed. Hydrogen and light gases, including hydrocarbon gases such as methane, ethane and propane are separated from the $C_5+$ liquid reformate of 98 Research Octane Number (clear). A portion of hydrogen and light hydrocarbon gases is recycled and can be treated for removal of sulfur, nitrogen and water. The gas is then repressured to about 300 psig. The repressured recycle gas is split into two streams on the basis of about 3 moles of gas per mole of fresh naphtha for mixing with the incoming fresh naphtha. The second stream of recycle gas is combined with the third reactor effluent at a recycle rate of about 9 moles of gas per mole of naphtha feed (total recycle: 12 moles of gas per mole of feed).

During the processing cycle the inlet temperature of the last reactor is periodically raised to maintain a yield of 98 RON reformate. The inlet temperatures of the first three reactors are periodically raised by 10°F., 10°F., and 5°F., respectively, to prevent the change in the temperature drop in each of these reactors from varying more than approximately 7°F. in each reactor. Typical inlet temperatures of the reactors at the end of the processing cycle of the respective reactors are 920°F., 930°F., 935°F., and 990°F., for the first, second, third and fourth reactors, respectively.

It is claimed:

1. In a method of reforming naphthene and paraffin-containing petroleum hydrocarbons of gasoline or naphtha boiling range in the presence of molecular hydrogen wherein is employed in series a plurality of catalytic reaction zones to provide reformates of at least about 90 RON and hydrogen-containing recycle gas, the improvement which comprises providing at least one naphthene dehydrogenation zone in the early portion of said plurality of reaction zones, at least the initial said naphthene dehydrogenation zone having a catalyst consisting essentially of a platinum group metal and rhenium on a solid, porous, acidic oxide support having a t-butylbenzene dealkylation activity at 455°C. (without water addition) of about 20 to 750 cc.(STP)/g./min., and at least one paraffin dehydrocyclization zone in a latter portion of said plurality of reaction zones, said paraffin dehydrocyclization zone having a catalyst consisting essentially of a platinum group metal on a relatively non-acidic support and having an essential absence of rhenium, the support of said catalyst having a t-butylbenzene dealkylation activity at 455°C. (without water addition) up to about 15 cc.(STP)/g./min., introducing hydrocarbon of gasoline or naphtha boiling range into said naphthene dehydrogenation zone at an inlet temperature of at least about 820°F., the inlet temperature of such paraffin dehydrocyclization zone being sufficient to give a reformate of at least about 90 RON.

2. The method of claim 1 wherein the support of the catlayst in the paraffin dehydrocyclization zone is alumina.

3. The method of claim 2 wherein the support of the catalyst in said initial naphthene dehydrogenation zone is comprised of silica and alumina.

4. The method of claim 3 wherein the platinum group metal of the catalysts is platinum.

5. The method of claim 3 wherein the alumina of the catalyst in said paraffin dehydrocyclization zone is derived by calcination of hydrous alumina predominating in trihydrate.

6. The method of claim 5 wherein the platinum group metal of the catalysts is platinum.

7. In a method of reforming naphthene and paraffin-containing petroleum hydrocarbons of gasoline or naphtha boiling range in the presence of molecular hydrogen and supported platinum group metal reforming catalysts wherein is employed in series a plurality of catalytic reaction zones, each of said plurality of zones being preceded by heating means for the hydrocarbon processed and molecular hydrogen, to provide reformates of at least about 90 RON and hydrogen-containing recycle gas, the improvement which comprises providing at least one naphthene dehydrogenation zone in the early portion of said plurality of reaction zones, at least the initial said naphthene dehydrogenation zone having a catalyst consisting essentially of a platinum group metal and rhenium on a solid, porous, acidic, metal oxide support having a t-butylbenzene dealkylation activity of about 30 to 500 cc.(STP)/g./min., and at least one paraffin dehydrocyclization zone in a latter portion of said plurality of reaction zones, said paraffin dehydrocyclization zone having a catalyst consisting essentially of a platinum group metal on a support and having an essential absence of rhenium, the support of said catalyst having a t-butylbenzene dealkylation activity at 455°C. (without water addition) of up to about 10 cc.(STP)/g./min., introducing said hydrocarbon of gasoline or naphtha boiling range containing at least about 15 percent by volume of naphthenes and at least about 25 percent by volume of paraffins into such naphthene dehydrogenation zone at an inlet temperature of about 820° to 920°F., for at least about 80 percent of the total reforming process time while passing a portion of said recycle gas to such naphthene dehydrogenation zone at a rate of about 0.5 to 8 moles of recycle gas per mole of gasoline boiling range hydrocarbon feed and for a reaction time sufficient to provide an effluent from the last such naphthene dehydrogenation zone having less than about 10 percent by weight naphthenes above the thermodynamic minimum, passing effluent from said naphthene dehydrogenation zone to said paraffin dehydrocyclization zone, the inlet temperature of such paraffin dehydrocyclization zone being about 900° to 1000°F., and run to give a reformate of at least about 90 RON, said dehydrocyclization zone inlet temperature being at least 20°F. greater than the inlet temperature of the first naphthene dehydrogenation zone for at least about 50 percent of the total reforming process time, while passing a portion of the hydrogen-containing recycle gas to such paraffin dehydrocyclization zone at a rate such that the total gas recycle to the paraffin dehydrocyclization zone is about 7 to 30 moles of said recycle gas per mole of gasoline boiling range feed, said portion of hydrogen-containing recycle gas to said paraffin dehydrocyclization zone being at least a third of the hydrogen-containing recycle gas recycled, the catalyst volume distribution of the naphthene dehydrogenation zones to the paraffin dehydrocyclization zones being between about 1:20 to 3:1, and maintaining such zones under endothermic conditions.

8. The method of claim 7 wherein the platinum group metal of the catalysts is platinum.

9. The method of claim 8 wherein the support of the catalyst in the paraffin dehydrocyclization zone is alumina.

10. The method of claim 9 wherein the support of the catalyst in said initial naphthene dehydrogenation zone is comprised of silica and alumina.

11. The method of claim 10 wherein the inlet temperature of the naphthene dehydrogenation zone is about 840° to 890°F.

12. The method of claim 11 wherein the mole ratio of hydrogen-containing recycle gas to gasoline boiling range hydrocarbon in the naphthene dehydrogenation zone is about 1 to 4:1 and the mole ratio of hydrogen-containing recycle gas to gasoline boiling range hydrocarbon in the paraffin dehydrocyclization zone is about 8 to 15:1.

13. The method of claim 1 wherein the sulfur content of the total hydrocarbon feed and recycle gas passing to said naphthene dehydrogenation zone is less than about 10 p.p.m.

14. The method of claim 13 wherein the platinum group metal of the catalysts is platinum.

15. The method of claim 14 wherein the impurity levels of both the hydrocarbon feed and recycle gas are below about 10 p.p.m. water, 5 p.p.m. sulfur, and 2 p.p.m. combined nitrogen.

16. The method of claim 15 wherein the alumina of the paraffin dehydrocyclization zone catalyst is derived by calcination of hydrous alumina predominating in trihydrate.

17. The method of claim 7 wherein the sulfur content of the total hydrocarbon feed and recycle gas passing to said naphthene dehydrogenation zone is less than about 10 p.p.m.

18. The method of claim 17 wherein the platinum group metal of the catalysts is platinum.

19. The method of claim 18 wherein the alumina of the paraffin dehydrocyclization zone catalyst is derived by calcination of hydrous alumina predominating in trihydrate.

* * * * *